(12) United States Patent
Collingwood et al.

(10) Patent No.: US 7,364,393 B2
(45) Date of Patent: Apr. 29, 2008

(54) MACHINE ADAPTATION

(75) Inventors: David Collingwood, North Woodchester (GB); Graham Richard Ferguson, Roudborough (GB); Timothy Donald Hayter, Wotton-under-Edge (GB); Tim Prestidge, Bath (GB); Clive Esmond Harwood Renton, Luckington (GB); Edward Stott, Hewelsfield (GB); David Kenneth Thomas, Thornbury (GB)

(73) Assignee: Renishaw PLC, Gloucestershire (GB)

( * ) Notice: Subject to any disclaimer, the term of this patent is extended or adjusted under 35 U.S.C. 154(b) by 335 days.

(21) Appl. No.: 10/511,140

(22) PCT Filed: Apr. 17, 2003

(86) PCT No.: PCT/GB03/01677

§ 371 (c)(1),
(2), (4) Date: Oct. 14, 2004

(87) PCT Pub. No.: WO03/089188

PCT Pub. Date: Oct. 30, 2003

(65) Prior Publication Data

US 2005/0172506 A1    Aug. 11, 2005

(30) Foreign Application Priority Data

Apr. 20, 2002  (GB) .................... 0209072.8
May 21, 2002  (GB) .................... 0211617.6

(51) Int. Cl.
*B23C 1/00* (2006.01)
*B23Q 15/00* (2006.01)

(52) U.S. Cl. ............ 409/231; 409/186; 409/193; 409/207; 483/9; 483/12; 408/8

(58) Field of Classification Search ........ 409/186–188, 409/193–195, 204, 207–209, 231; 483/7–12; 408/8–13
See application file for complete search history.

(56) References Cited

U.S. PATENT DOCUMENTS

| 3,818,334 | A | * | 6/1974 | Rosenberg ............... 73/781 |
| 3,995,969 | A | * | 12/1976 | Fleming ............... 408/12 |
| 4,339,714 | A | | 7/1982 | Ellis |
| 4,536,661 | A | | 8/1985 | McMurtry |

(Continued)

FOREIGN PATENT DOCUMENTS

EP    0 504 691 A2    9/1992

(Continued)

*Primary Examiner*—Monica Carter
*Assistant Examiner*—Eric A. Gates
(74) *Attorney, Agent, or Firm*—Oliff & Berridge, PLC

(57) ABSTRACT

The invention relates to the transmission of power and/or data from/to a stationary part of a machine tool 200 to/from an accessory 100 mounted in the spindle 210 of the machine tool 200. A first electrical link or interface 1a,1b,1c,1d provides electrical communication between the stationary part 200 and the spindle 210, and a second electrical link or interface 3 is provided electrically connected to the first electrical link at the accessory mounting area 230. The second link 3 is in the form of electrical contacts. The invention extends to an accessory shank 360 for mounting to the spindle 210 of the machine tool, and also to an accessory 100 e.g. in the form of a measurement probe, connected to the said shank 360.

14 Claims, 17 Drawing Sheets

U.S. PATENT DOCUMENTS

| | | | | |
|---|---|---|---|---|
| 4,579,487 A | * | 4/1986 | Lehmkuhl | 409/134 |
| 4,722,021 A | * | 1/1988 | Hornung et al. | 361/49 |
| 4,742,470 A | * | 5/1988 | Juengel | 700/175 |
| 4,761,101 A | * | 8/1988 | Zettl | 408/6 |
| 4,831,785 A | * | 5/1989 | Sigg | 451/1 |
| 4,854,786 A | * | 8/1989 | Alexander et al. | 408/1 R |
| 4,879,660 A | * | 11/1989 | Asakura et al. | 700/173 |
| 4,944,643 A | * | 7/1990 | Lehmkuhl | 409/80 |
| 4,954,022 A | * | 9/1990 | Underwood et al. | 408/1 R |
| 5,109,223 A | | 4/1992 | Schmitt et al. | |
| 5,407,416 A | * | 4/1995 | Ottone et al. | 483/12 |
| 5,791,836 A | | 8/1998 | Feufel | |
| 5,802,937 A | * | 9/1998 | Day et al. | 82/1.11 |

FOREIGN PATENT DOCUMENTS

| | | |
|---|---|---|
| EP | 1092499 A2 | 4/2001 |
| EP | 1 114 693 A2 | 7/2001 |

* cited by examiner

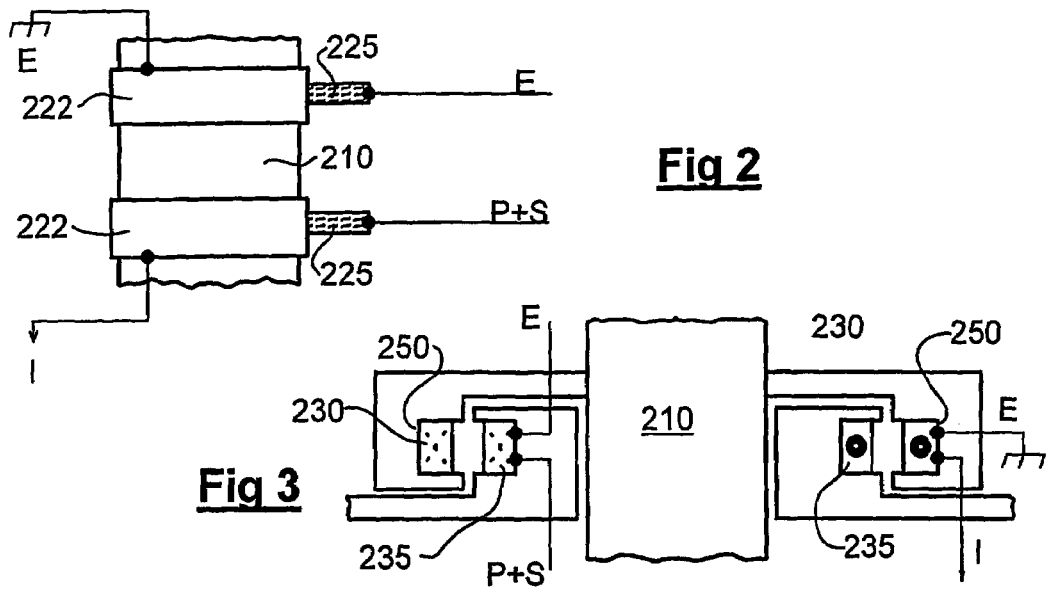
Fig 2
Fig 3
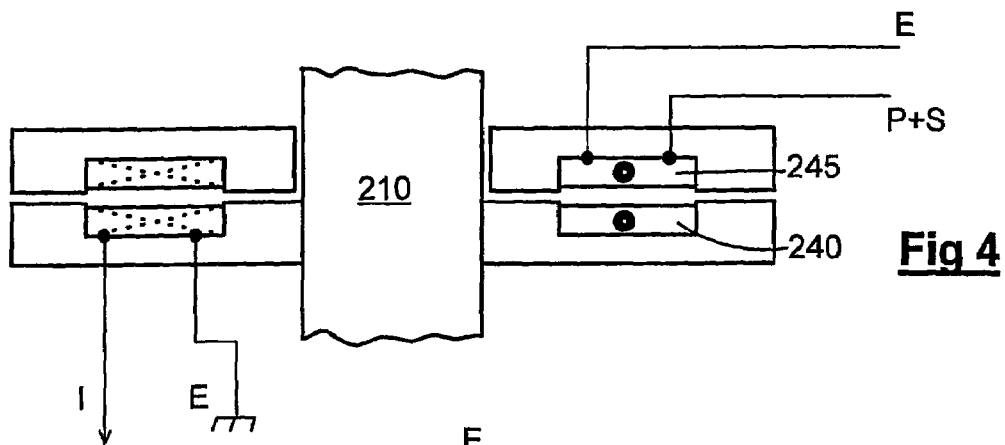
Fig 4
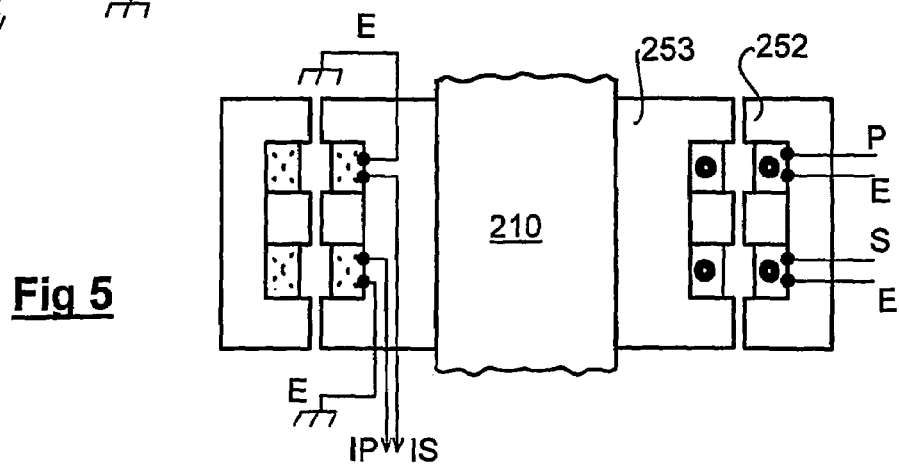
Fig 5

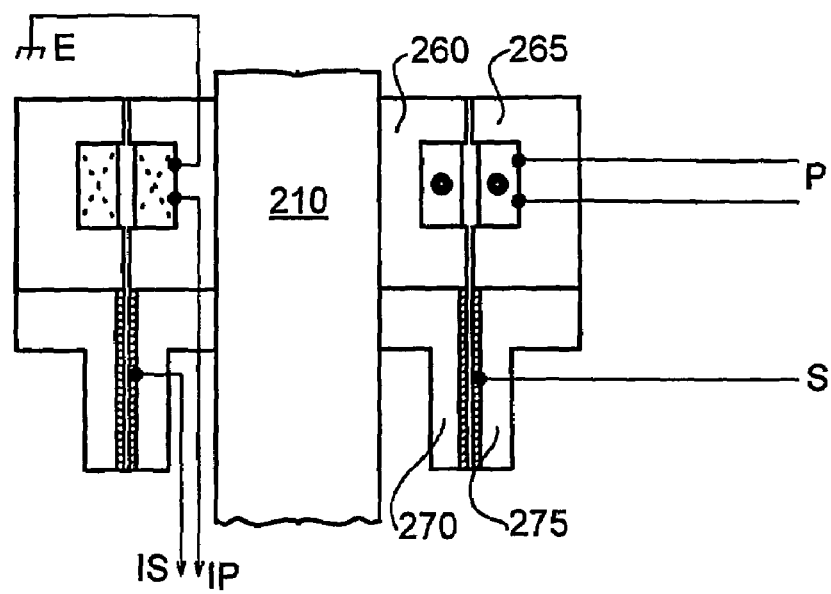
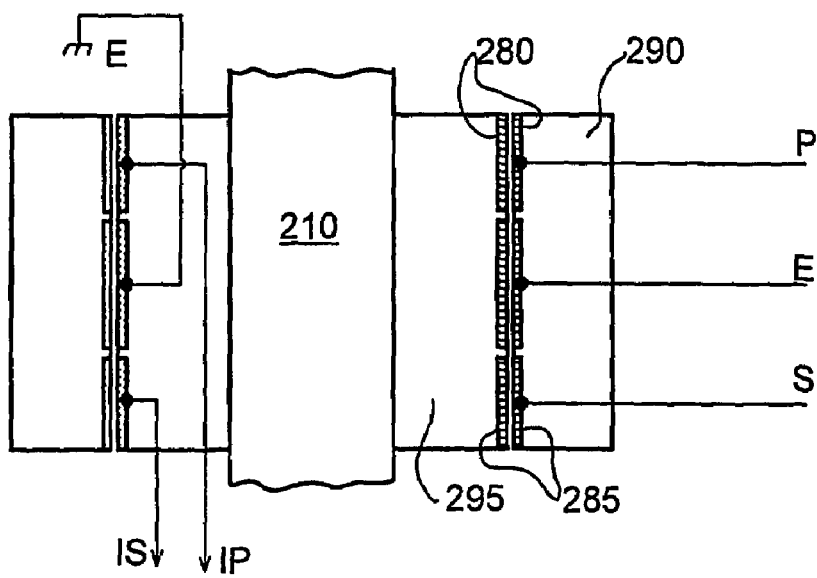
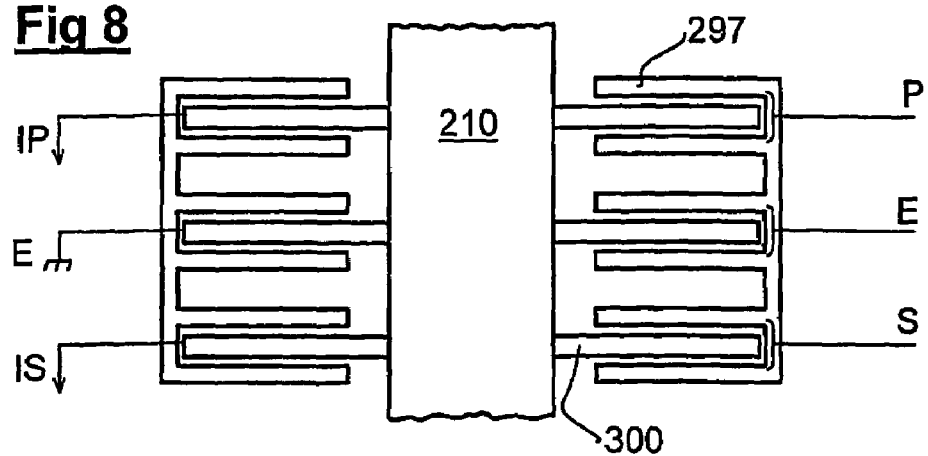

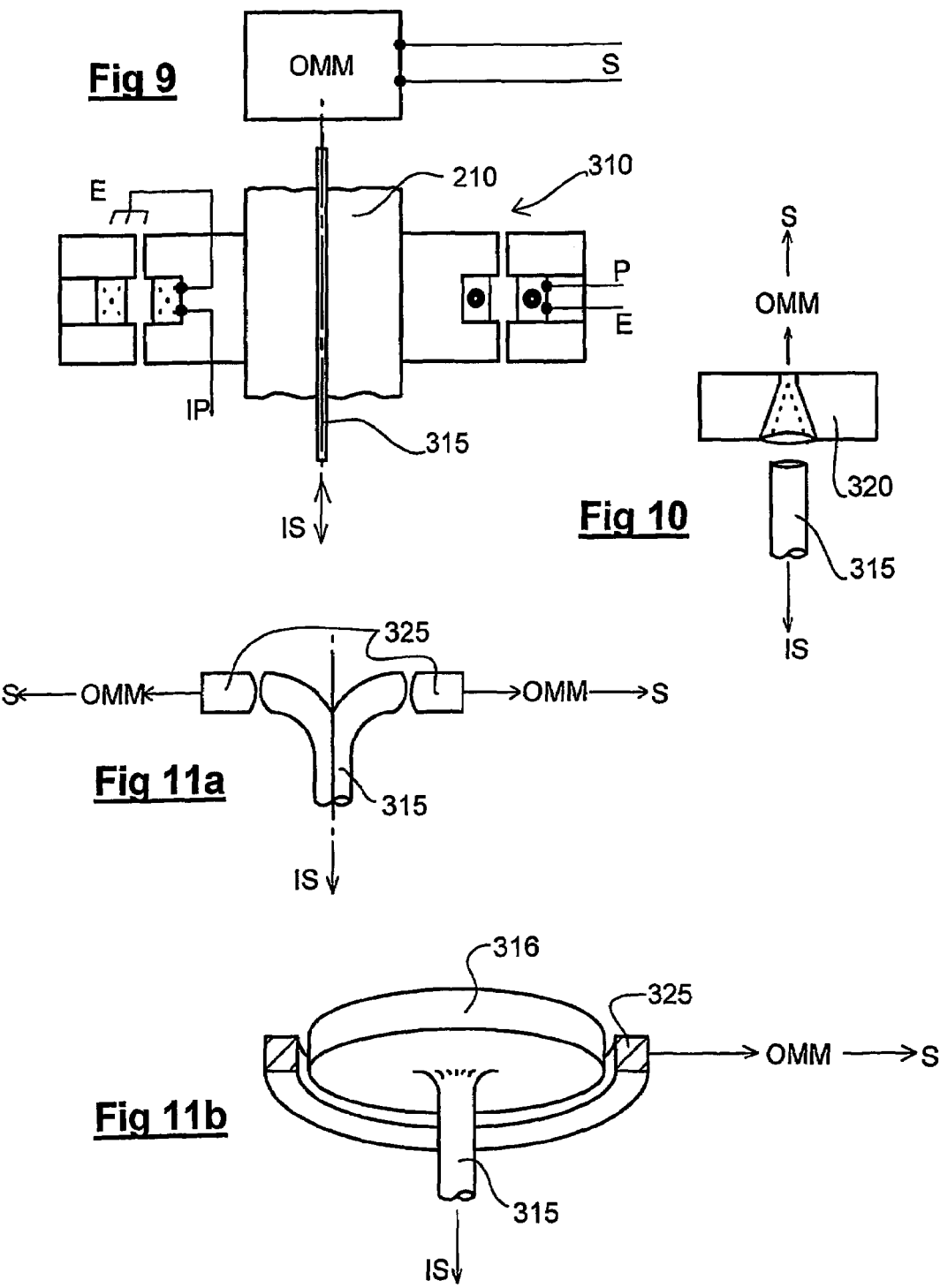

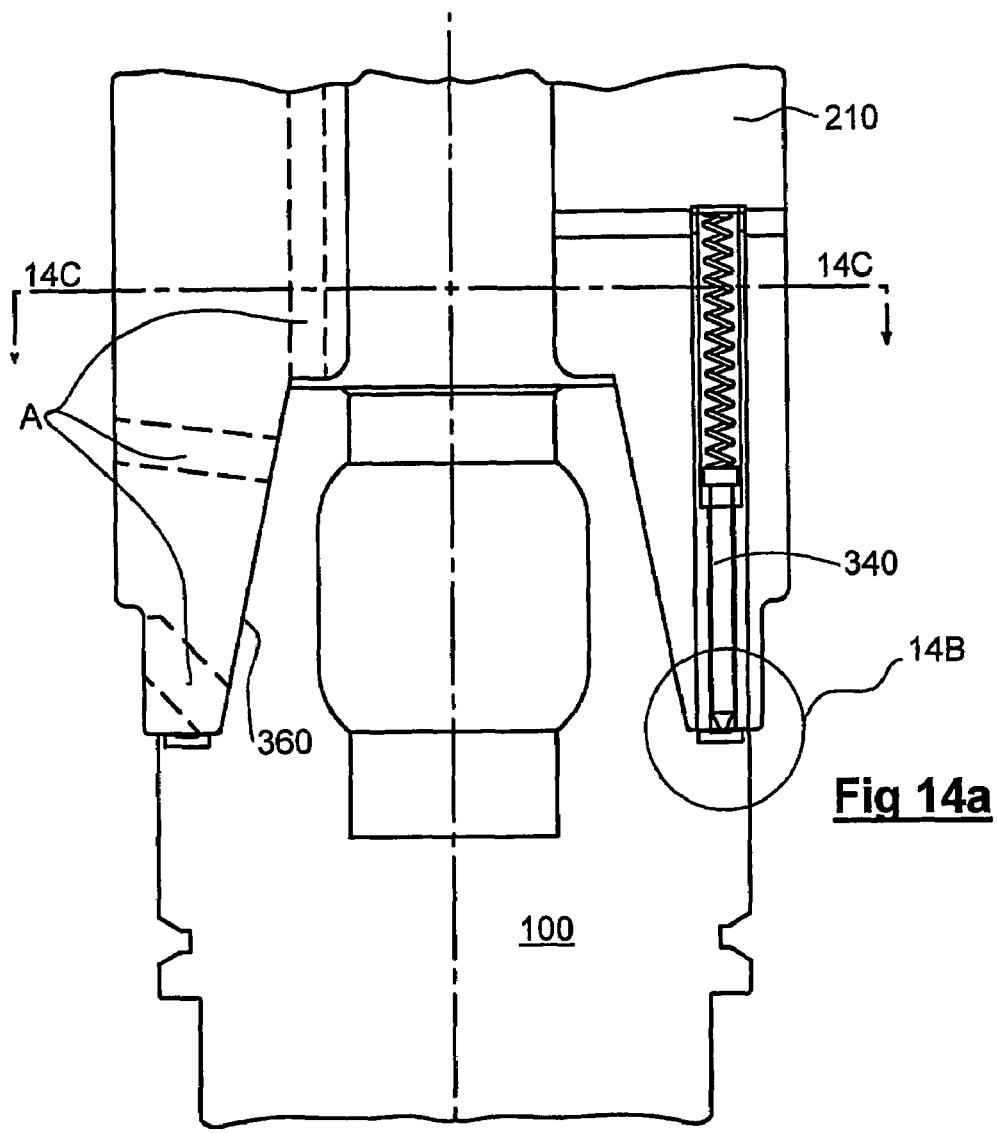
Fig 14a
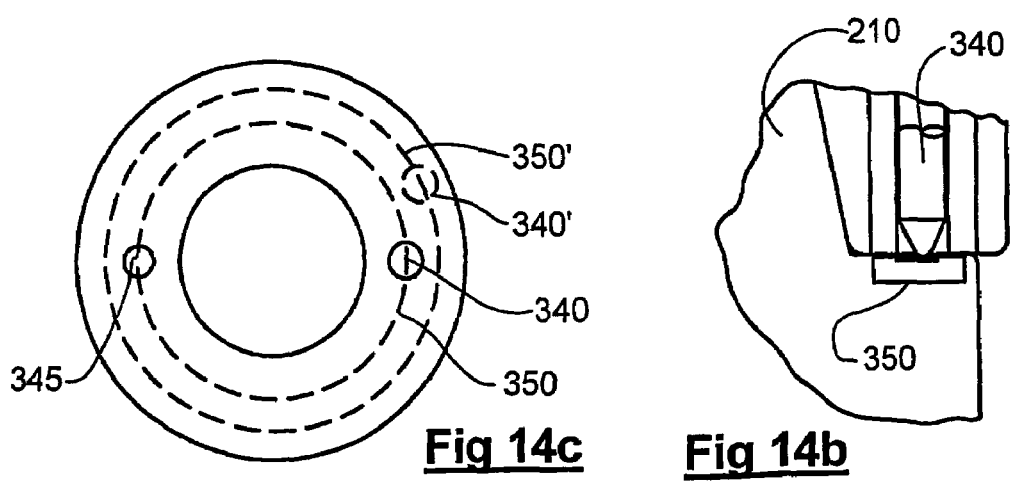
Fig 14c  Fig 14b

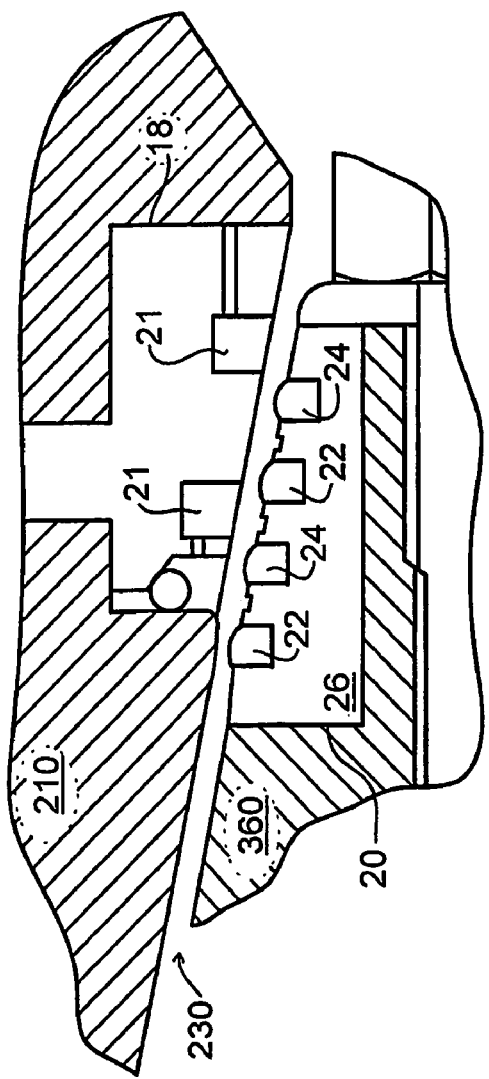
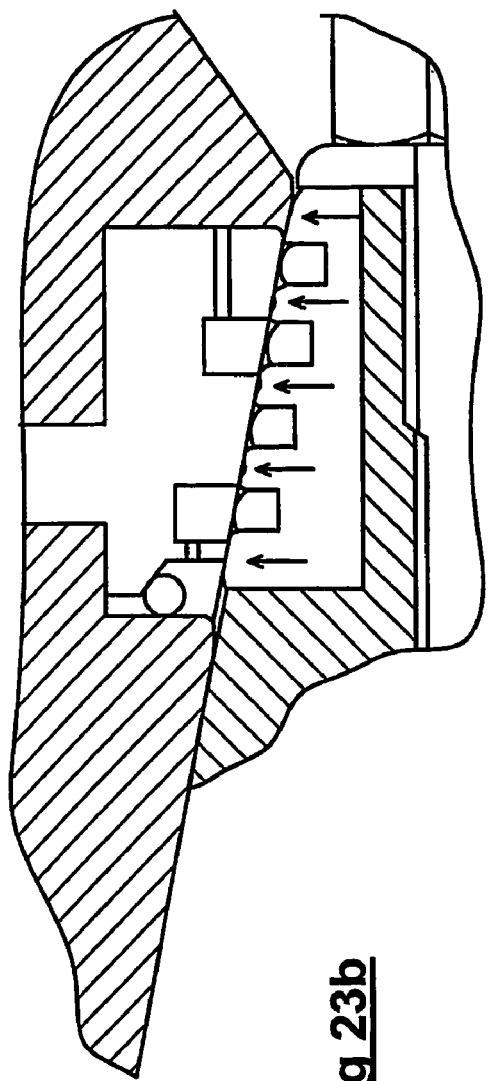
Fig 23a
Fig 23b

MACHINE ADAPTATION

This invention relates to the transmission of power and/or data within a machine e.g. a machine tool, and relates particularly, but not exclusively, to apparatus for the supply of power to and data communication with an electrical accessory e.g. a measurement probe mounted on the machine spindle.

When an electrical accessory like a measurement probe is located in a machine tool spindle, normally used for cutters, it becomes difficult to supply that accessory with power and to provide a signal path to and/or from that accessory. Batteries have a limited life, particularly when wireless transmission of large amounts of probing data to a remote receiver takes place. Also it is undesirable to have extra power supply or data transmission parts fitted around the machine's spindle because these parts can interfere with cutters subsequently located in the spindle, or these parts may collide with a workpiece or automatic cutter changer mechanism.

One example of a machine which includes parts fitted around the spindle for supplying power to and signal transmission from the machine is shown in U.S. Pat. No. 4,339,714. Other similar devices are shown in U.S. Pat. Nos. 5,791,836 and 4,536,661.

An arrangement for providing a signal path within a machine tool is disclosed in U.S. Pat. No. 5,109,223. The disclosure shows a machine tool body having a signal path to a rotatable spindle in the form of a first inductive link. Also shown is a second inductive link between the spindle and a measurement probe across the widest portion tapered shank (5). A probe is mounted to the shank.

The arrangement of the second link in that patent is not suited to modern machine tools because the wide area at the base of the taper is highly stressed when cutters are being used, due to e.g. high cutter side loading and high spindle speeds. The position of this second link means that it is likely to be knocked by cutter shanks being inserted and removed from the shank holder. Thus it would be difficult for a machine tool manufacturer to successfully adapt his existing machine design to incorporate the arrangement illustrated. Likewise a new design would require additional strengthening to compensate for the weakness created by the second inductive link illustrated.

Furthermore the links will not transmit enough power if they are too small. So it seems that it is a necessity to position the second link at the larger end of the tapered shank in order to maximise its size. Moreover, use on small tool shanks (30 mm diameter or less say) would not be a practical proposition because the link at the shank would be far too small to transmit enough power.

For an inductive link to function effectively the ferrite elements mentioned in U.S. Pat. No. 5,109,223 should not be separated by magnetisable material (e.g. the metal surface of the shank). Consequently an interruption in the surface of the shank would have to be made at the link on the shank for effective operation. Such an interruption would have to be sealed. Sealing of non-metallic parts to metallic parts is very difficult in the machine tool operating environment at the stressed position indicated in FIG. 1 of U.S. Pat. No. 5,109,223.

The arrangement of FIG. 1 in that document requires relative orientation between the tool shank and the spindle. Such orientation is not always possible on machine tools. The arrangement of FIG. 2 requires an annular recess in the shank at the aforementioned highly stressed location.

The transmission of power to the probe is not contemplated in U.S. Pat. No. 5,109,223.

According to a first aspect of the present invention there is provided a machine tool comprising a stationary part and a spindle, the spindle having a shank receiving area for releasably accepting the shank of a cutter or other machine tool accessory, and comprising a first electrical link between the stationary part and the spindle, and a portion of a second electrical link at the shank receiving area in electrical connection with the first link for providing in use a disconnectable electrical link between the spindle and the shank, wherein the portion of the second link is in the form of at least one electrical contact.

In this description an electrical contact is any part which provides physical conductive contact and thus produces a conductive path across a link for electricity. The first link is described as the first element in the description and the second link is described as the third element.

According to a second aspect of the invention there is provided a machine tool shank for releasably mounting a machine tool cutter or other machine tool accessory to the spindle of a machine tool comprising a portion of an electrical link in the form of at least one electrical contact.

According to a third aspect of the invention there is provided a machine tool accessory having a shank for releasably mounting the accessory to the spindle of a machine tool comprising a portion of an electrical link in the form of at least one electrical contact, the accessory being supplyable with power, or having a signal path, via the electrical contact.

According to a fourth aspect of the invention there is provided a machine tool comprising a stationary part, a spindle having a shank receiving area, a shank releasably acceptable to the shank receiving area, and a machine tool accessory attached to the shank, and comprising a first electrical link between the stationary part and the spindle and a second electrical link at the shank receiving area being in electrical communication with the first link for providing in use a disconnectable electrical link between the spindle and the shank for providing power or a signal for the accessory, wherein the second link is formed as two portions, one portion being mounted to the spindle the other portion being mounted to the shank, wherein each portion has at least one complementary contact for electrical communication between the two portions.

The invention extends also to a measurement probe as claimed.

Preferably the links mentioned above are used to supply power to the accessory. Preferably the links are used to transmit signals to and/or from the accessory.

The invention will now be described with reference to the drawings, wherein:

FIGS. 2-11 show various embodiments of apparatus for supplying power to the spindle, and for transmitting data to or receiving data from the spindle;

FIGS. 14-24 show various embodiments of apparatus for supplying power or receiving/transmitting data from a spindle to an accessory mounted in the spindle.

Figure 1:
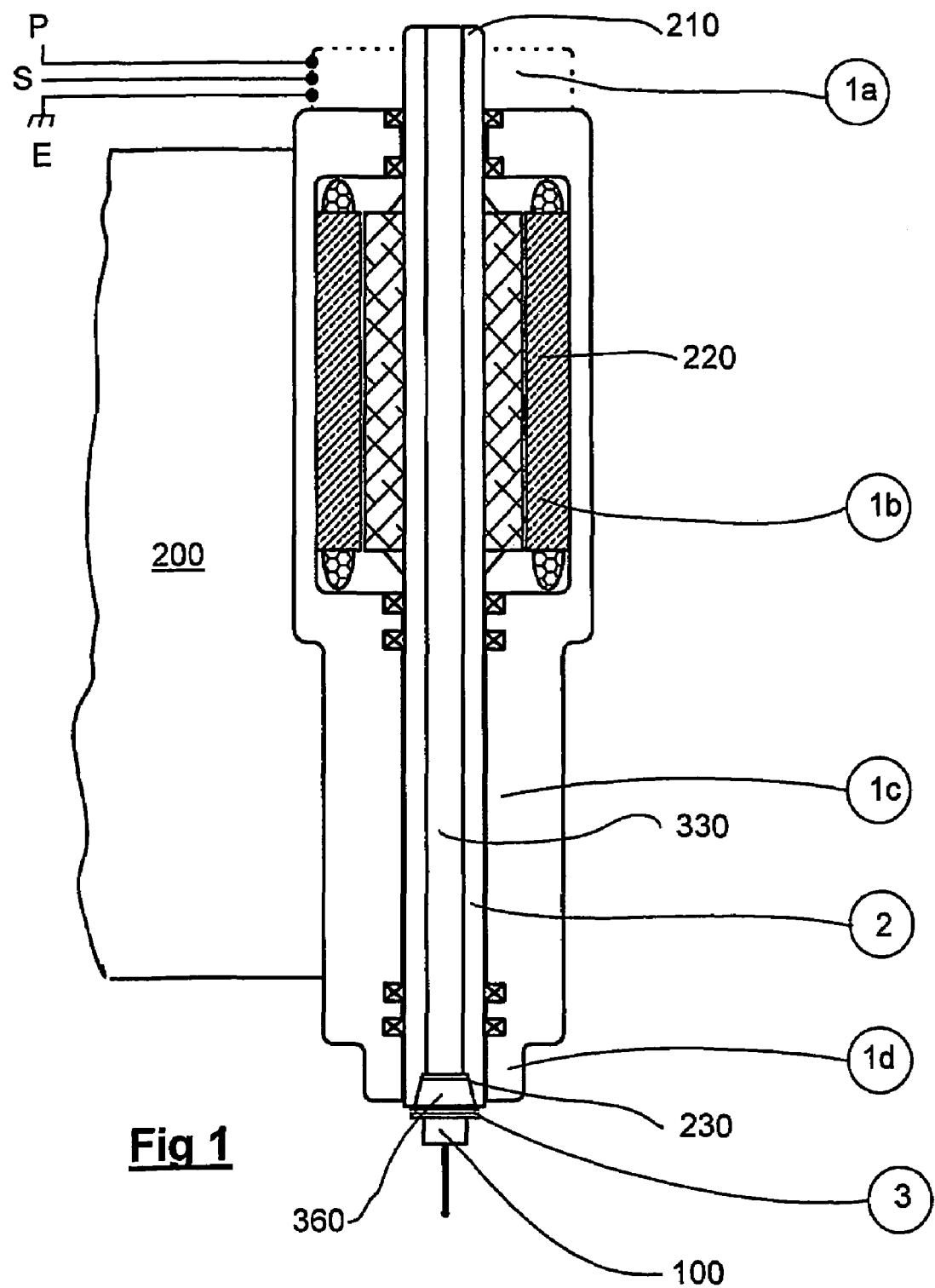
FIG. 1 shows a typical arrangement of a machine tool spindle adapted for the supply of power to, and data transmission both to and from an accessory mounted thereon.

Referring to FIG. 1, part of a machine tool 200 is shown having a spindle 210 driven directly by motor 220. A cavity or shank receiving area in the form of a tapered housing 230 in the spindle 210 is used to hold a cutter or, as in this illustration, a measurement probe 100. Modern machine tools have automatic cutter changers. Other accessories can be used also in place of a cutter. All will be mounted on a standard tool shank 360. Most standard tool shanks are of tapered (frustum) configuration. With this invention a carousel of cutters together with one or more accessories will be used and selection of the correct cutter/accessory will be made by a program. When a measurement operation is to be performed then an accessory in the form of a measurement probe will be selected from the carousel and automatically fitted into the spindle. The machine can be moved into the desired location and the workpiece can be measured, either by translational movement of the spindle or (if the probe itself can move) by keeping the spindle stationary and manipulating the probe.

In order to provide power and a signal path to the measurement probe 100 or other accessory on the machine tool 200 via rotary components (in this case a continuously rotatable spindle 210) three elements are required. The first element is an electrical link between the stationary machine 200 and the spindle 210 for providing power and/or signal connections across a rotary interface, the second is a path along the spindle 210, and the third element is a disconnectable electrical link from the spindle to the probe 100 or other accessory at the shank receiving area 230.

There are a number of positions at which this first element (variants of which are described in detail below) may be positioned, examples of which are shown in FIG. 1 as circled references 1a,1b,1c and 1d. Position 1a has been illustrated schematically in chain-dotted lines and provides a rotary link giving a signal path S, power supply P and (in this instance) a chassis return E.

Reference 1b shows another possible position for the first element. In position 1b it is likely that the link between the machine and its spindle will be formed within the motor 220 and take the form of a stator and rotor coil as described below.

References 1c and 1d show other possible positions for the first element which may take the form of any of the links described below with the benefit of complete enclosure.

Reference 2 indicates the second element i.e. the power and signal path along the spindle joining the first and third elements. Alternative embodiments for this part are described below.

Reference 3 likewise indicates the position of the third element i.e. the link between the spindle 210 and probe 100 or other accessory. Alternatives for this part are described below also.

FIGS. 2-11 show various ways of providing power and signal links from the static machine 200 to a rotating part, in this case spindle 210.

FIG. 2 shows a slip ring arrangement having two rings 222 and two wipers 225, one supplying power combined with a signal (P+S) and one forming a common return E. The power and signal supply is intended to be transmitted via an insulated path I along the spindle and the common return E is formed by the remainder of the spindle. Three or more slip rings could be used e.g. for separate power and signal paths.

FIG. 3 shows another machine to spindle link in the form of an inductive rotary transformer. In this variant an alternating current is passed through static transformer windings 235 and is picked up by rotary coil 230. One set of windings only is used in this arrangement but more may be used e.g. a pair of sets. In the present arrangement the power and signal P and S are combined in one alternating current sent to accessory 100 via insulated spindle track I, and returned via spindle path E. This rotary transformer is more robust when very high spindle speeds are used e.g. 50,000 rpm, because the coils of the transformer will be pushed centripetally against side walls 250 in use. These walls will support the coils during rotation.

FIG. 4 shows another machine to spindle link in the form of a single coil rotary transformer which has an axially spaced stator 245 and rotor 240. This arrangement operates in a similar manner to the rotary transformer shown in FIG. 3.

FIG. 5 shows a machine to spindle inductive link in the form of a multiple coil rotary transformer having rotary and stationary parts 252 and 253 respectively: In use a separate power and signal path can be utilised, in which case two insulated paths IP and IS will be required on the spindle. A common spindle return E is used here.

FIG. 6 shows another machine to spindle link this variant employs a rotary transformer having a stator 265 and a rotor 260 in combination with a capacitance link which likewise has a stator part 275 and a rotor part 270. A signal S is passed via the capacitance link and power is supplied via the rotary transformer.

The spindle has two insulated paths IS and IP and a common return E.

FIG. 7 shows a machine to spindle link which is solely capacitive. A stator 290 is shown and a rotor 295. In this example there is a power path P-IP and a separate signal path S-IS as well as a common return E. The power path will have to have a relatively high capacitance and so the surface area of the capacitive plates 280 should be larger in comparison to the area of the signal path plates 285.

FIG. 8 shows another capacitive machine to spindle link. This variant has radially extending plates 297/300 to provide more surface area than might be achievable with the circumferentially extending plates illustrated in FIGS. 6 and 7. This example functions in the same manner as the capacitive link shown in FIG. 7 and described above. Shown is a stator 297 and a rotor 300.

FIG. 9 shows yet another machine to spindle link. In this example a rotary transformer 310 is used for power transmission. A signal path IS is provided by an optical fibre 315 in the spindle co-operating with an optical machine module (OMM). The signal path in the spindle is via the optical fibre 315 which rotates in use. A small gap for light to cross is present between static OMM and rotary parts of the spindle. Thus a rotary link is formed for a signal. An optical transceiver in the spindle or accessory may be provided for two-way communication along the fibre 315.

FIGS. 10 and 11 show examples of optical fibre to OMM links. FIG. 10 shows a fibre 315 which can transmit and/or receive data via a static axial emitter/sensor 320. FIG. 11a shows a y-shaped fibre 315 which can transmit and/or receive data via a ring of static emitters/sensors 325 disposed circumferentially about the ends of the y-shaped fibre 315. FIG. 11b shows a fibre 315 merging into a disk 316 which again can transmit and/or receive data via a ring of static emitters/sensors 325.

The electrical link shown in FIG. 2 is a contact link whereas the electrical links shown in FIGS. 3-11b are all non-contact links.

Figure 12:
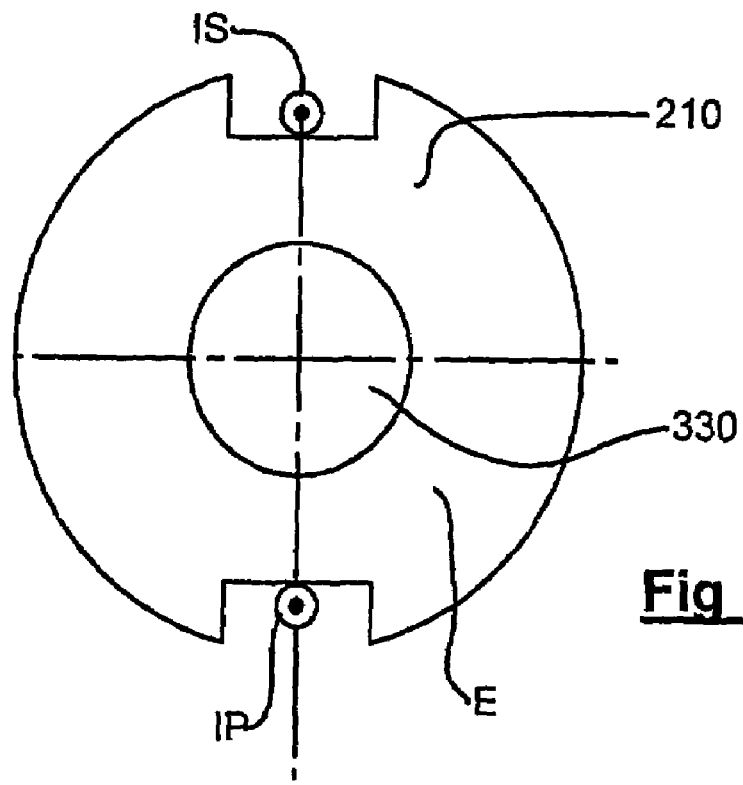
FIGS. 12 and 13 show apparatus for carrying power and signals along a spindle.
Figure 13:
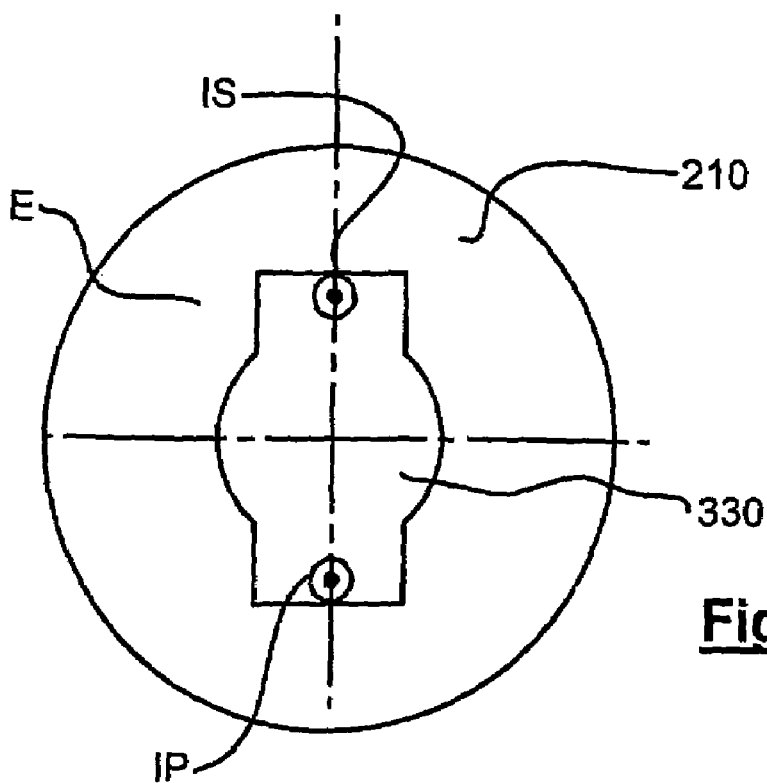

FIGS. 12 and 13 illustrate examples of the second element and show sections through spindle 210, having a draw-bar bore 330. Each Figure shows two insulated paths IS and IP for signal and power respectively, as well as a common return E formed by the remainder of the spindle. Two wires are used in these examples for dynamic balancing of the spindle. A combined signal and power path might be used so one wire only would then be required. A counterweight or asymmetric section might be used to provide a balanced shaft if only one wire was present. Shown are two insulated wires but more than two wires may be used. Alternatively or additionally one or more optical fibres may form the required signal path. Optical fibres may be omitted entirely, so a straight line light path may be provided between the machine to spindle link and the electrical device.

The electrical paths IS and IP may be formed by any distinct conductive path e.g. by flexible conductive strips possibly in a groove or grooves, or curled up inside the central draw-bar bore 330. The power and signal paths may be formed by an insulated draw-bar, a discrete strip of conductive plating formed on the spindle or draw-bar, or concentric insulated tubes within the spindle or within the draw-bar.

FIGS. 14a,b and c show an example of a third element of the invention i.e. the disconnectable link between the spindle and the electrical device. FIG. 14a is a cross-section through the end of spindle 210 showing a probe 100 within the tapered housing of the spindle. FIG. 14b is an enlarged partial view of FIG. 14a and FIG. 14c is a section through the spindle 210 at 14c-14c in FIG. 14a.

In this example probe 100 is supplied with power as well as a signal path via a spring-loaded contact 340 at the spindle in communication with an insulated circumferential track 350 on the probe 100. The tapered fitting of the probe allows direct contact of the probe with the spindle e.g. at surface 360 thus providing a common chassis return for the power and signal.

Alternative positions for the spring contact 340 are shown at A. In this example only one spring contact 340 is shown. However, for balance a dummy contact 345 (FIG. 14c) might be employed. Further, more than one spring contact 340, in combination with two or more insulated circumferential tracks 350 may be used e.g. for separate power and signal paths (e.g. 340',350' shown in chain-dotted lines in FIG. 14c. The spring contact(s) 340(340') may be provided in the shank 100, and track(s) 350 may be provided at the spindle 210. The tracks 350,350' may be part circumferential.

Figure 14D:
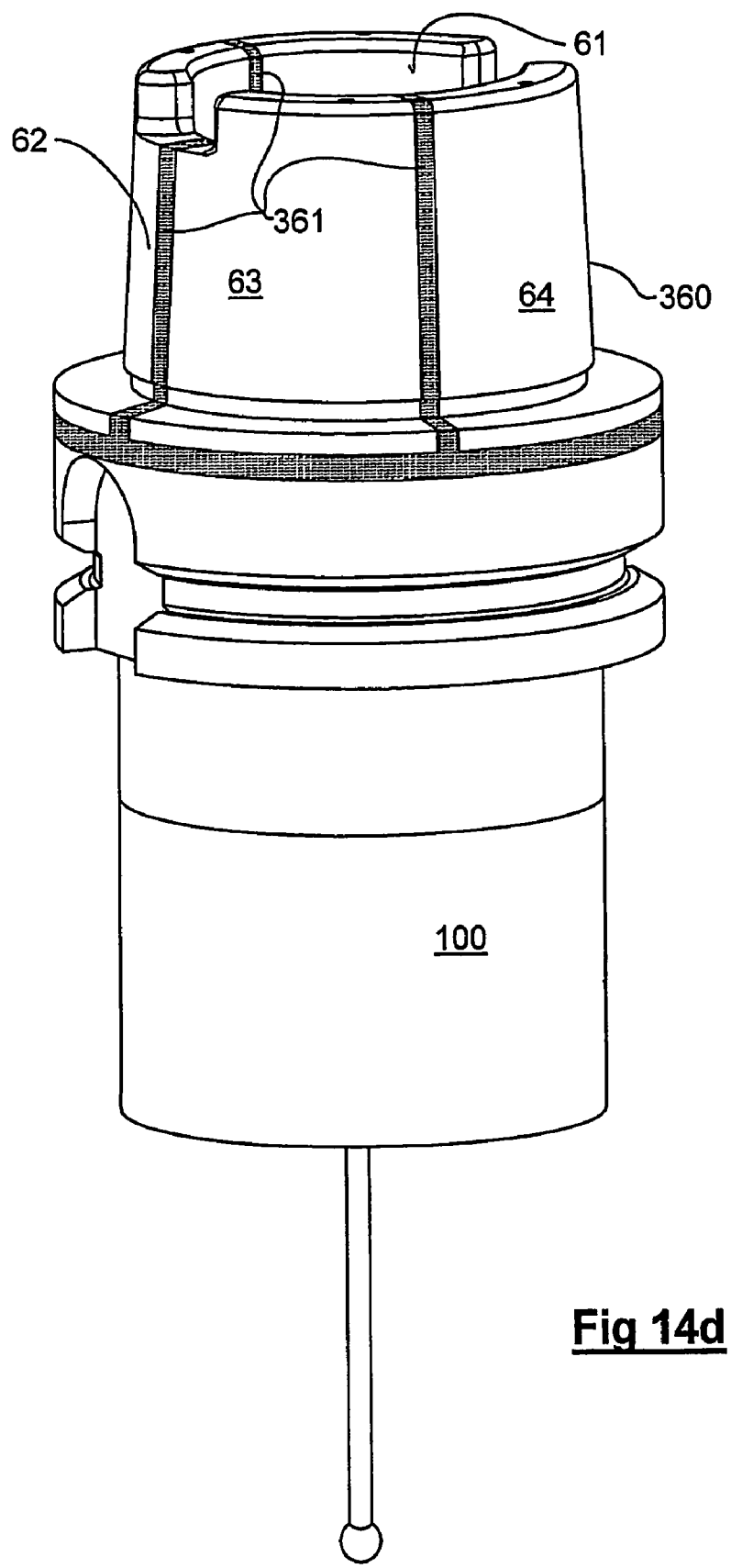

FIG. 14d shows a variant of the probe illustrated in FIGS. 14a,b&c. In this variant, instead of insulated tracks 350, the shank 360 of the probe is divided (into quadrants 61,62,63 & 64 in this instance). Each division has its own sprung contact as described immediately above. Such a contact will be disposed in the position shown in FIG. 14a or the positions A.

Instead of tracks 350 shown in FIGS. 14b and c, the shank might be divided by insulating tracks 361 into a number of discrete areas. In this instance four contacts would be arranged on the spindle at 90° to each other so that they coincided with the quadrants.

Figure 15:
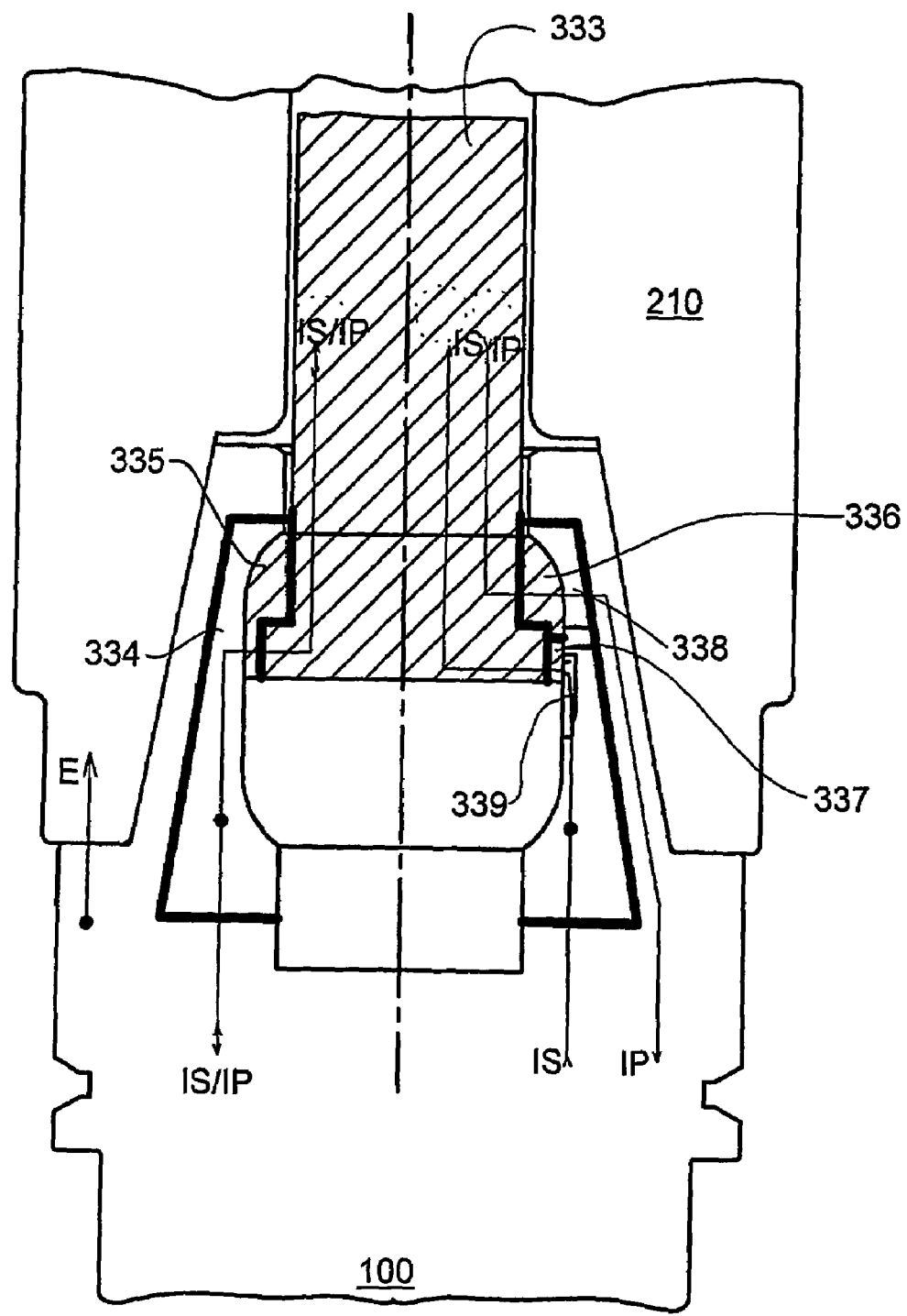

FIG. 15 shows two alternative spindle to probe links. In this illustration one example is shown on the left side of the centre line and a second example is shown on the right side of the centre line. In each case electrical insulation between parts is indicated by thick lines.

On the left side a combined signal and power path IS/IP is shown incorporated into a draw-bar 333. An insulated portion of the draw-bar 335 in use contacts an insulated section 334 of the probe 100. Thus the path of the power and signal is kept electrically separated from the remainder of the spindle, draw-bar and probe. The chassis forms the return path E. On the right side are shown separate signal and power path IS and IP. In this example the draw-bar 333 has two insulated portions 336 and 337. These portions are in communication with an insulated element 338 and a spring contact 339 respectively each on the probe 100. Again electrically separated paths are formed between the signal draw-bar and the probe and the chassis forms the return path E.

Figure 16A:
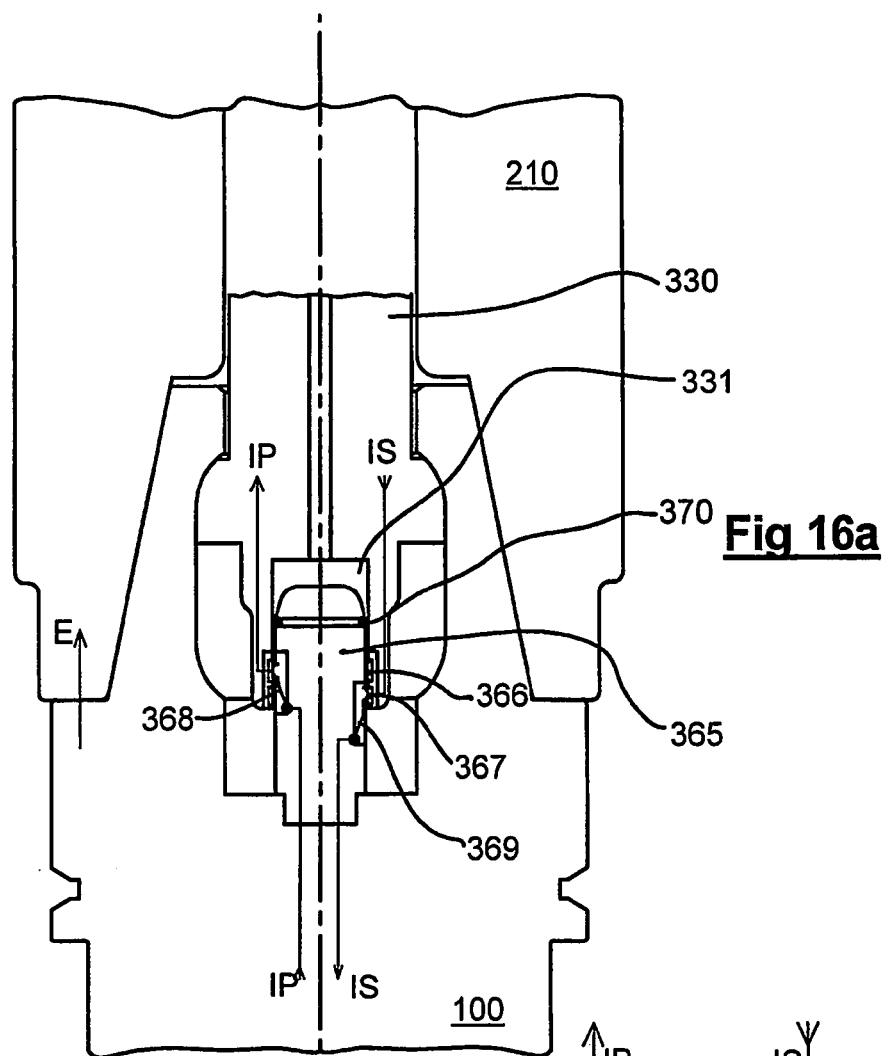
Figure 16B:
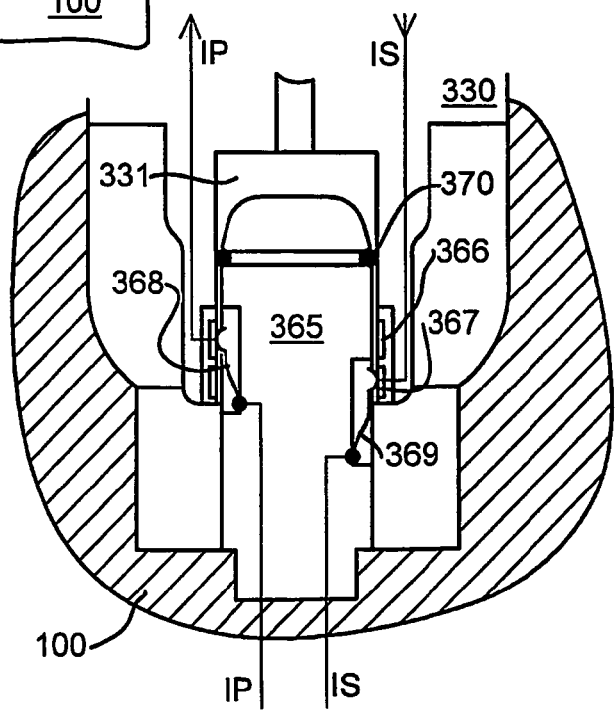

FIG. 16a shows an alternative link from the spindle to the probe. In this example use is made of a coolant channel 331 within the draw-bar 330. This channel is unused when the probe 100 is mounted in the spindle. The channel incorporates, in this example, two rings 366 and 367 which co-operate with two spring contacts 368 and 369 mounted on a plug 365 which blocks the coolant channel 331. Wiper ring 370 acts to remove any coolant from the rings 366 and 367 when the probe is inserted into the spindle, and prevents drips reaching the contacts during operation of the probe. A chassis return E is used in this example also. FIG. 16b shows an enlargement of the parts of the link. Plug 365 could be hollow to allow coolant feed for other accessories.

Figure 17:
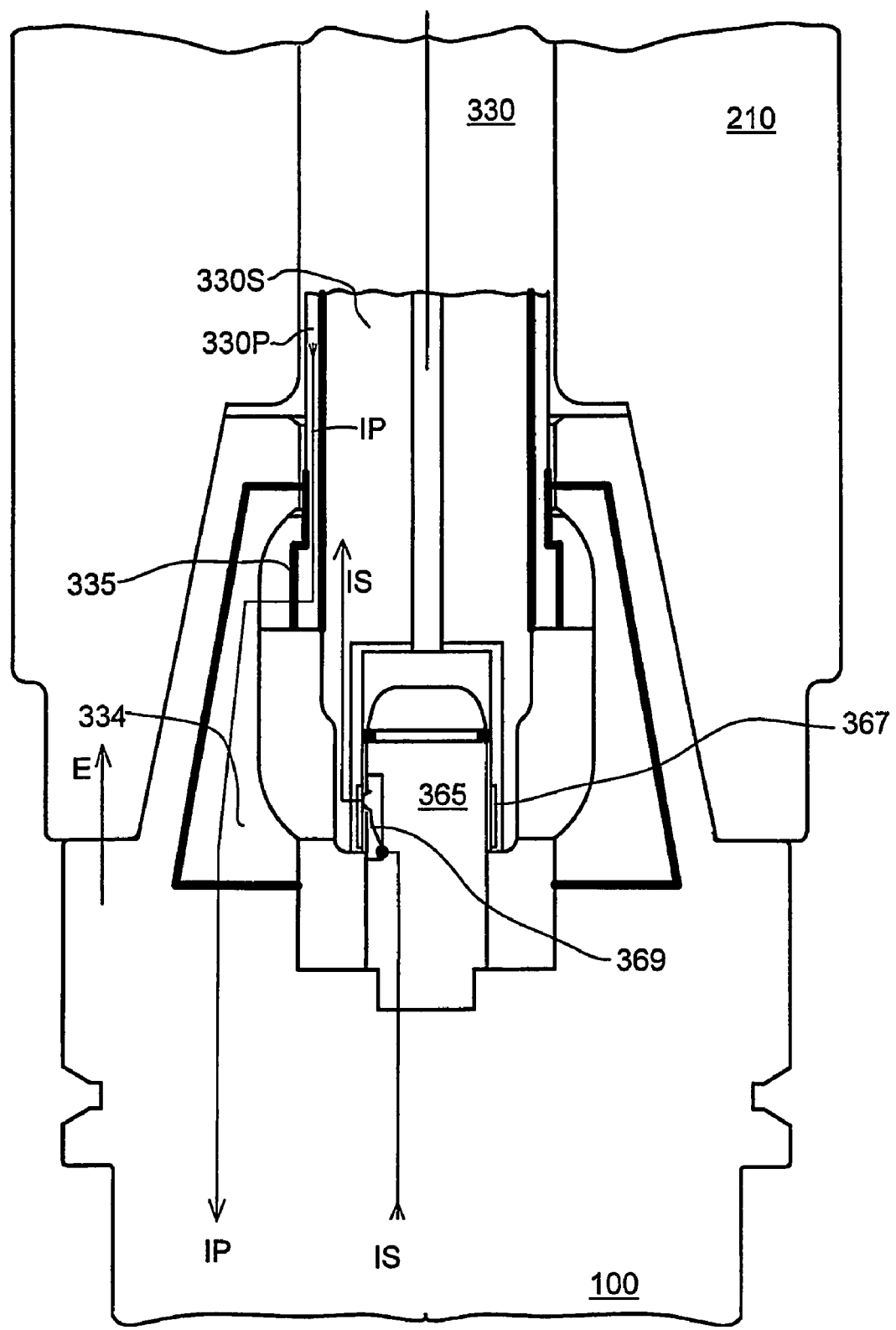

FIG. 17 shows yet another example of a link to the probe from the spindle. In this example separate signal and power paths are provided. Draw-bar 330 has concentric inner and outer parts 330S and 330P respectively, which are insulated from each other and from the spindle 210. Thus the inner part of the draw-bar 330S provides a signal path and the outer part 330P provides a power path, while the spindle forms a return. Ring 367 on the inner draw-bar part, in use, is in electrical communication with spring contact 369 on the probe, thus linking the draw-bar and the probe with a signal path. Insulated portion 335 on the outer draw-bar part in use, is in electrical communication with insulated section 334 on the probe and links also the draw-bar and the probe with a power path. The spindle forms a chassis return.

The links shown in FIGS. 14a to 17 are contact links, but the spindle to probe electrical link may be non-contact e.g. capacitive or inductive and may take the form similar to the links described for the first element, as illustrated in FIGS. 3 to 9.

Figure 18:
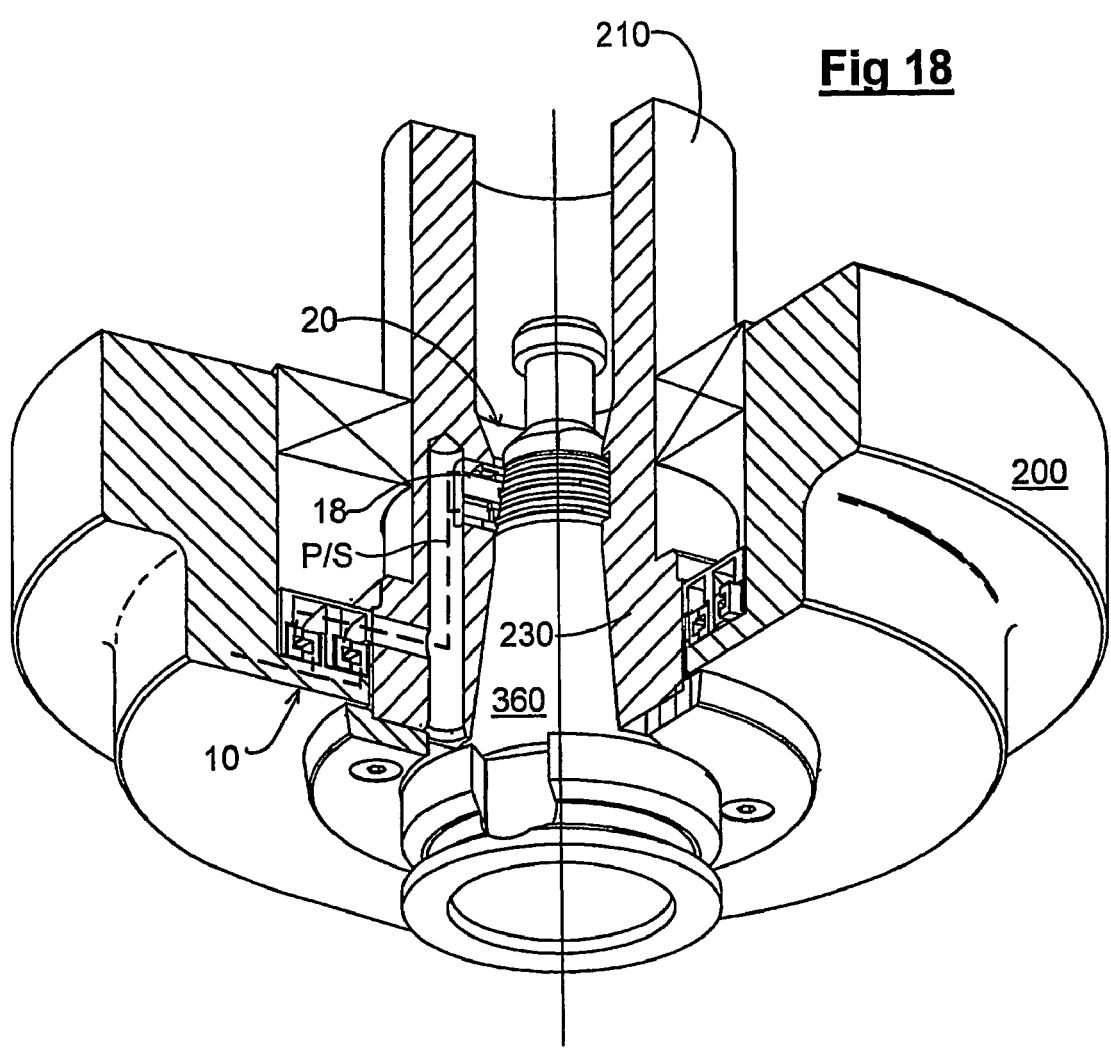

FIG. 18 shows an embodiment having first (1d), second (2) and third (3) elements at the base of the machine 200 illustrated in FIG. 1. In more detail there is shown an inductive link 10 providing power and signal transmission between machine 200 and spindle 210. A path through the spindle, for the power and signal, is provided in the location of the dotted line P/S. The tapered housing 230 of the spindle 210 incorporates contacts 18 that communicate electrically with complementary contacts 20 on tapered shank 360. The complementary contacts 20 are electrically connected to the accessory 100 to be fitted to the shank 360.

It will be noted that the link between the spindle and the shank is positioned at the rear of the shank housing 230. In that position the link e.g. the contacts, in the housing is unlikely to be damaged when cutters or accessories are inserted or removed from the housing. Also the stresses in the spindle are far less than they are at the front of the housing so a larger link can be used and there is no risk of mechanical failure of the spindle. The advantages mentioned above arise when the link (not necessarily of the contact type) is positioned in the rear third of the housing. However, those advantages are evident when the link is placed in the rear half of the housing. Use of contacts allows a greater transfer of power between the spindle and shank than can be achieved with the same size non-contact (e.g. inductive) link.

A scheme of the electrical paths for this embodiment is shown in FIG. 23 and is described below.

Figure 19:
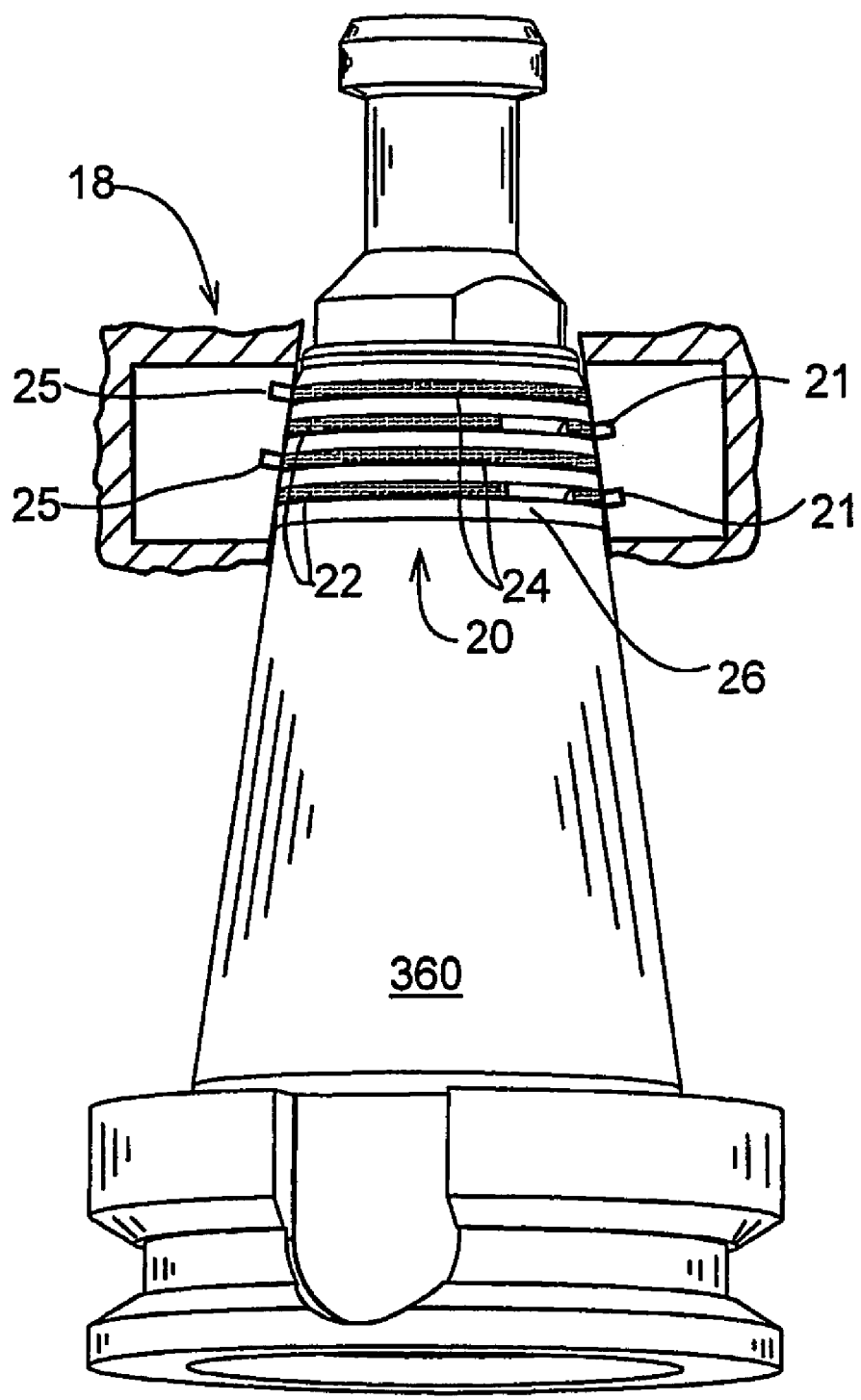

FIG. 19 shows shank 360, spindle mounted contacts 18 and shank contacts 20. In this embodiment the contacts are two sets of "C" shaped rings 21/22 & 24/25 of sprung metal, each forming part of an electrical path to an accessory 100 (not shown). Rings 22,24 are mounted to the shank in a resilient electrically insulating material 26 e.g. an elastomeric material like vulcanised rubber or flexible polyurethane. The spindle contacts are situated toward the top of the tapered portion of the shank. The spindle contacts 21/25 are mounted in a non-conductive rigid plastics block, in two pairs on each side of the shank. They extend in an arc of approximately 50-90° around the rings 22/24. A complete ring around the shank is possible also. The electrical path to an accessory to be mounted to the shank is via conductors in through-holes in the shank (not shown). The shank shown in FIGS. 18&19 has the proportions of what is known as a BT40 type shank.

The contacts 21/25 are non-protruding and recessed so that a standard tool shank does not interfere with the contacts when a tool is used in the spindle.

Figure 20:
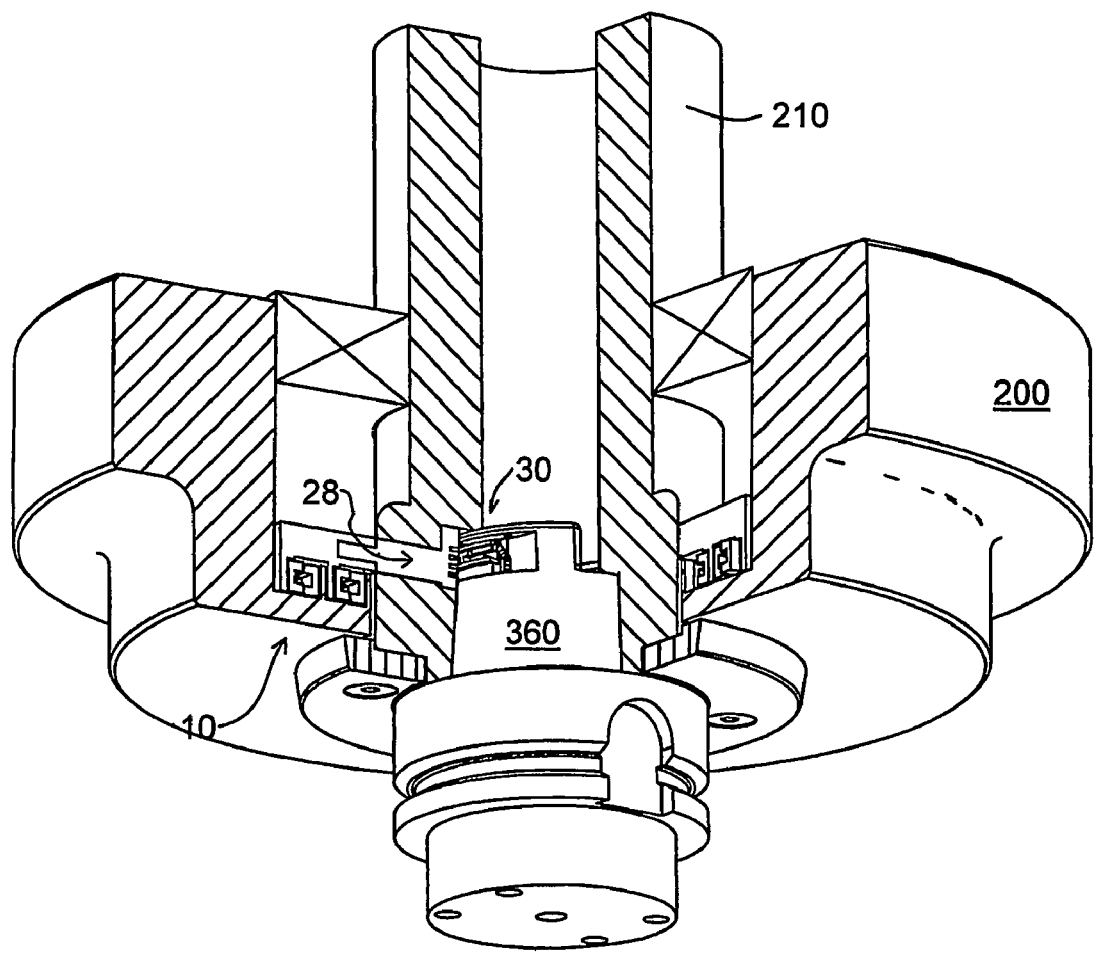

FIG. 20 shows a similar configuration to the embodiment shown in FIGS. 18&19. The shank illustrated in FIG. 20 is what is known as an HSK shank, otherwise the arrangement of the parts is similar to that shown in FIG. 18. The arrangement of the contacts 28/30 is similar to the contacts shown in FIGS. 18&19. They are constructed from the same materials and they are situated in the same place and therefore have the same advantages as the contacts mentioned immediately above. The contacts are shown in more detail in FIGS. 21 and 22.

Figure 21:
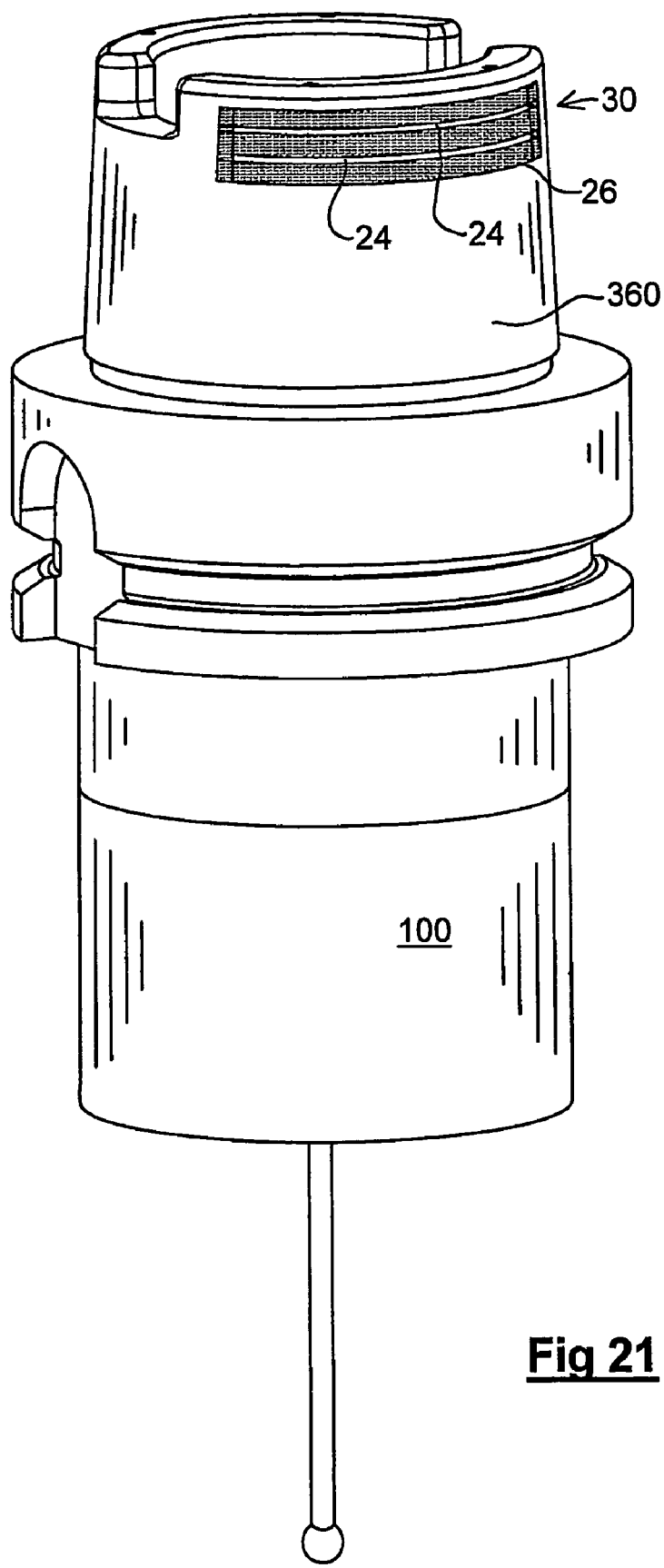

FIG. 21 shows a (HSK) shank 360 and accessory (probe) 100 attached thereto. Contact pair 30 is shown having conductive tracks 24 mounted in a non-conductive elastomeric material 26. A similar pair (not shown) is disposed on the opposite side of the shank. Again communication to the accessory 100 is via internal through-holes.

Figure 22:
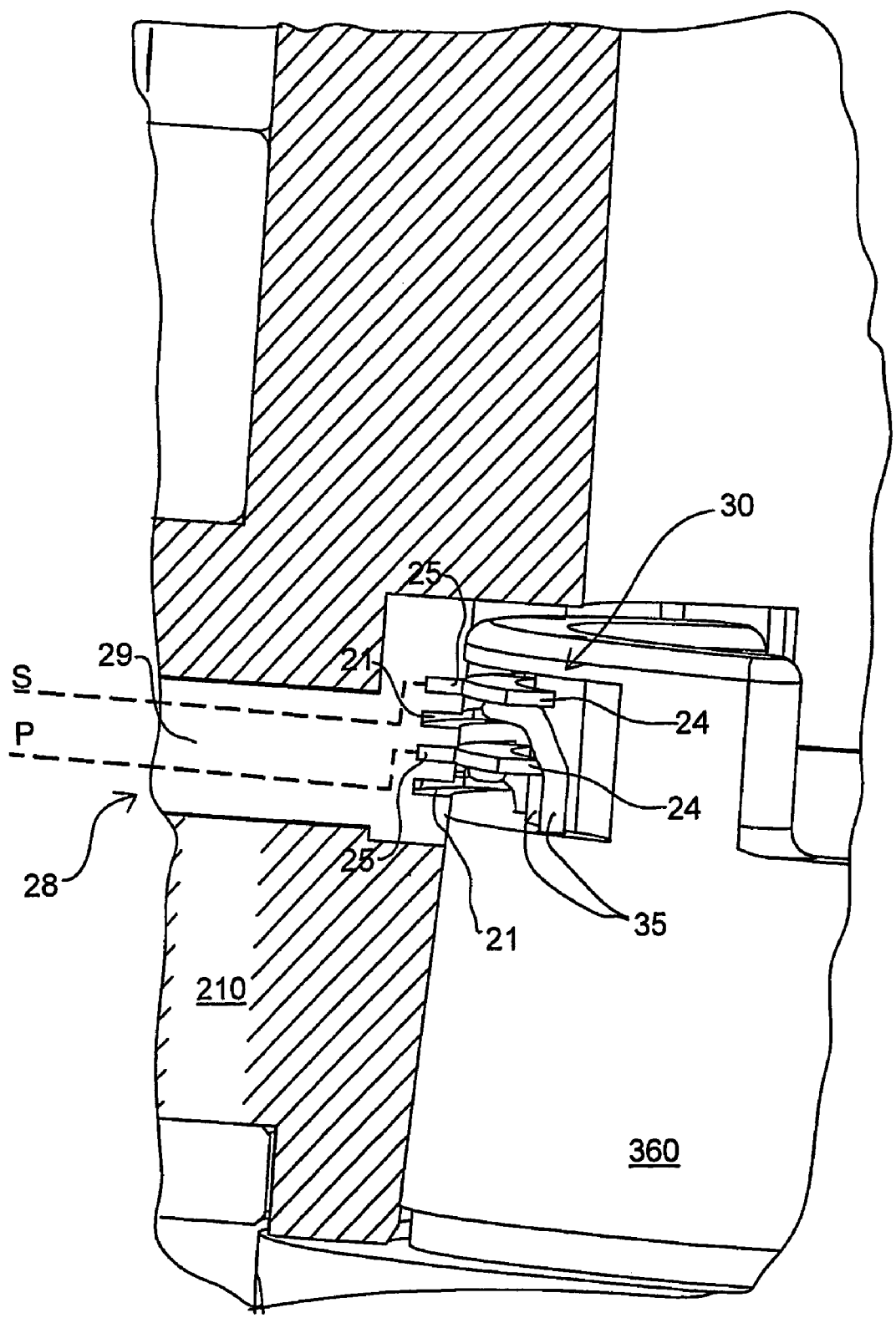

FIG. 22 shows a detail of the contacts 28/30 illustrated in FIG. 20. A "C" shaped plastics block 29 on each side of the spindle 210 houses contacts 28 formed by a pair of rigidly mounted metal "C" shaped rings 25 which communicate with contacts 24 on the shank. A similar contact block will be disposed on the opposite side of the spindle and will communicate with a respective contact pair at locations opposite to locations 21 shown in the Figure. The elastomeric material is shown removed for clarity, and two insulated conductors 35 which carry power or signal to the accessory can be seen.

The contact block may be offset to accommodate non-oriented shanks.

FIGS. 23*a* and 23*b* illustrate a section through a contact set that could be used with the embodiments illustrated in FIGS. 18-22. FIG. 23*a* shows the contacts separated whereas FIG. 22*b* shows the contacts forming a conductive path. The contacts have a similar construction to that illustrated in FIG. 19, and like parts have like reference numerals. Two contact blocks 18 will be provided in opposed positions, each of which are removable and are secured by means of a "C" clip. Contact block 26 is formed from elastomeric material, which is resiliently deformable, as a result of the contacts 22 and 24 being pushed inwardly when the shank 360 is pulled into the shank housing 230 on the spindle 210. The elastomeric material will bulge in the direction of the arrows shown in FIG. 23*b*. This bulging results in a displacement of any residual coolant etc around the contacts. It will be appreciated that the elastomeric material could be used on the outside contact block 18 or on both blocks 18 and 26. Preferably the contacts 22 and 24 are resiliently mounted so that they are forced outwardly against outer contacts in the spindle 210, when the spindle rotates, the outer contacts being rigid.

Figure 24:
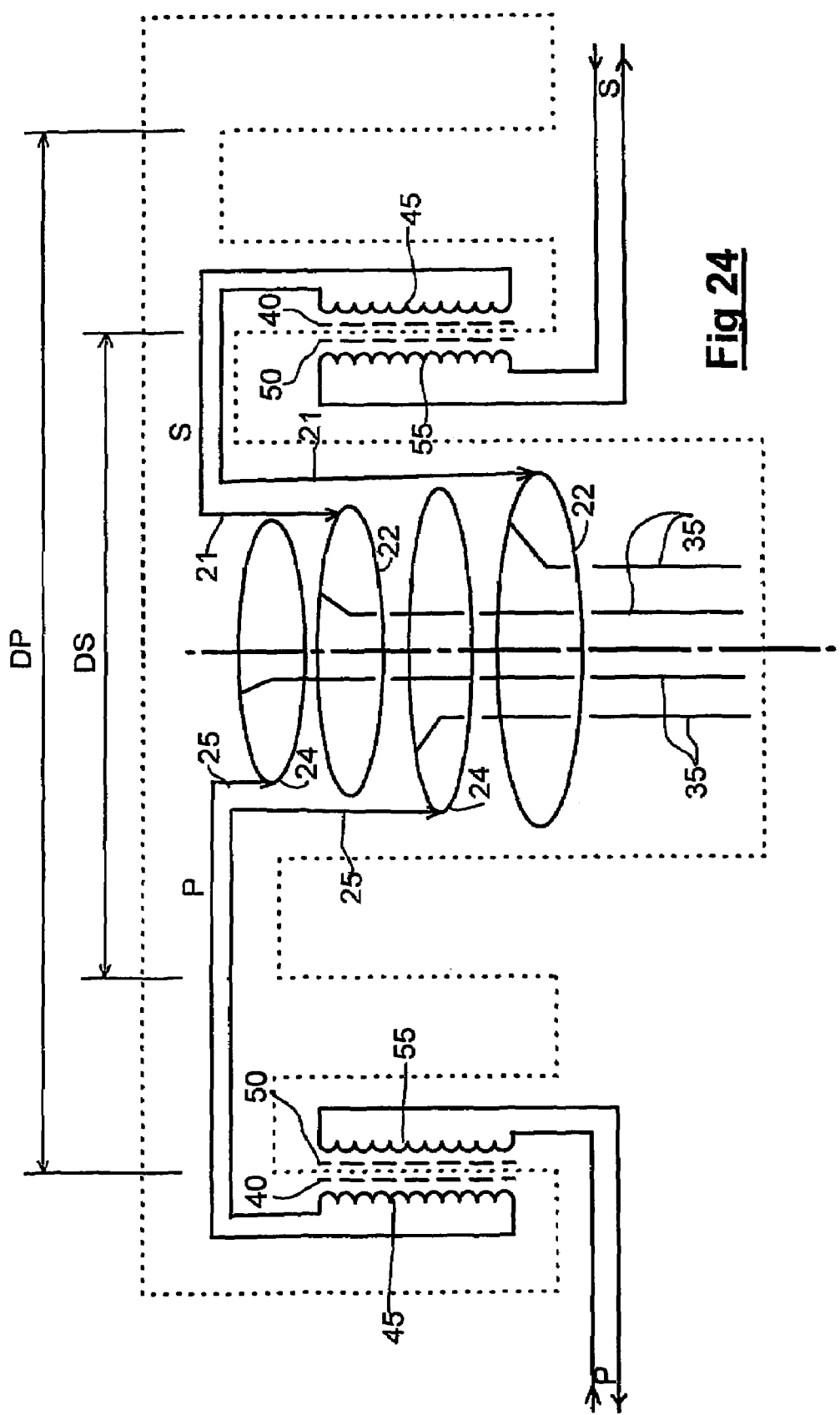

FIG. 24 is a schematic representation of the electrical principle used in the embodiments illustrated in FIGS. 18 to 22. Two inductive links are used to provide communication between the static housing and the rotating parts of the spindle, one for power and one for signalling. Shown also are two contact sets 21/22, 24/25 for communication between the spindle and the shank. Rotatable parts of the link are shown within the area bounded by the dotted line. Each inductive link is formed by a closely spaced pair of annular ferrite rings 40/50 (these are "U" shaped in the embodiments shown in FIGS. 18 & 20) each of which has a conductor coil 45/55 associated therewith. The ferrite rings and coils together form the non-contact inductive link between the stationary machine 200 and the spindle 210. The ferrite rings and coils may rotate relative to each other. The two sets of ferrite rings/coils have different diameters DP & DS so one set can be positioned within the other. This means that space in the axial direction of the machine can be conserved. The separation between inductive elements has been shown as cylindrical about the rotation axis of the spindle. However separation in a plane perpendicular to the axis is possible.

The advantages of supplying power and/or providing a signal path to a measurement probe via the machine to which it is mounted are:

that little or no internal power is required in the probe;

a lack of a battery compartment and transmission module enables the probe to be more compact;

an operator is not required to change batteries;

the contact, inductive or capacitive signal links described are less likely to suffer external interference than radio or light data transmission systems used outside the machine's spindle; and since no parts external to the machine are used then, when the probe is not in use, there are no residual parts to interfere with the other operations of the machine.

Whilst the invention has been described with reference to its application to a machine tool and measurement probe, it has many other applications and so is not intended to be limited to this field. For example the invention may find use in any machine which is adapted to accept an electrical device at a rotary machine part and which is capable of supplying power or a signal path to or from the device.

Examples of accessories other than probes that may be used with the rotary part described include: a robotic gripper or workpiece manipulator; a laser deburring tool (possibly articulatable); a laser driller/profiler/engraver/surface hardener; a camera e.g. for measuring surface finish or for monitoring tool breakage; adjustable size tooling, workpiece cleaners (e.g. vacuum cleaners); electromagnets; high speed motors (e.g. for deburring use) or a tool having supplemental equipment, such as wear, deflection, breakage, identification or usage recording devices.

Examples of different probes that might be used include: scanning probes e.g. analogue probes or data streaming probes; touch trigger probes; non-contact probes e.g. camera or laser probes or surface texture probes. Additionally probes could be articulated by mounting a movable probe head to the shank mentioned above.

The accessory may include data storage and the data may be read or rewritten. Data stored could include identification and, where a tool and supplemental equipment is used, tool geometry or usage information.

The description and claims refer to a shank. Herein the word shank is intended to embrace any coupling (e.g. male or female) which is suitable for removable coupling of a rotatable part of a machine to an accessory.

There are presently several standard tool shank designs i.e. the part of the tool which fits into the end of a machine tool's spindle. The probe 100 shown in FIGS. 1&14-23 illustrates only two types of shank (HSK & BT40). As a consequence any accessory used in place of the tool e.g. a probe, may require several different shanks to fit all the machines which have spindles adapted to supply power or to carry a signal. Thus a feature of this invention is the shank itself, i.e. coupling between the accessory and the rotatable part of the machine which, whilst illustrated as being a shank integral with the probe in some Figs may be a separate item which is selectable from a number of designs to suit the machine on which the accessory is to be used, but which will have the ability to transmit power to the accessory and/or will provide a signal path.

The shanks described herein and illustrated are intended to fit to a machine in use. However they may also be employed off the machine. For example the contacts on the shank may be used to provide pre-heating current for keeping a measurement probe or the like warm whilst it is off the machine, so that no thermally-induced errors in measurement occur. Another example is the uploading of tool data into a tool via the contacts e.g. geometry, tool set information, expected usage, number of teeth etc., before fitment to a machine.

The claims refer to a spindle. Herein the word "spindle" is intended to embrace any continuously rotatable part on a machine tool suitable for rotatably driving and holding a tool.

The word "link" used in the description and claims is intended to embrace all electrical interfaces, serial or parallel, singular or plural path, contact or non-contact.

Whilst power supply together with signal paths have been described and illustrated it will be apparent that the invention extends to the provision of power alone, the provision of a signal path alone (to an electrical device, from that device, or both ways) or the provision of both power and a signal path, either together or separately. Separate power and signal paths are preferred because there is then less likelihood of harmonic distortion of the signal.

The signal is preferably transmitted at a frequency of between 1 and 100 MHz. This range results in low losses. The power is preferably transmitted as a.c. at a frequency of more than 20 KHz (approximately 100 KHz being preferred). At this frequency, or greater, little electrolytic corrosion takes place between any contacts used. In order to reduce corrosion on contacts still further, the contacts can be made from Tungsten. Despite the lack of corrosion when using a.c. at a frequency of 20 KHz or above a short pulse of power could be used to remove any corrosion during use, particularly in the signal paths S.

The invention claimed is:

1. A machine tool comprising a stationary part and a spindle rotatable relative to the stationary part, the spindle having a shank receiving area for releasably accepting the shank of a cutter or other machine tool accessory, and comprising a first electrical link between the stationary part and the spindle, and a portion of a second electrical link at the shank receiving area in electrical connection with the first link for providing in use a disconnectable electrical link between the spindle and the shank, wherein the portion of the second link is in the form of a least one electrical contact, wherein the first link is an inductive link having complementary inductors which in use of the machine have relative displacement, one of the inductors being mounted to the spindle and the other of the inductors being mounted to the stationary part.

2. A machine tool according to claim 1 wherein, the portion of the second link at the shank receiving area includes any electrical link between the shank and the spindle.

3. A machine tool according to claim 2 wherein, the electrical link comprises a disconnectable physical contact between the spindle and the shank.

4. A machine tool according claim 1 wherein the receiving area is in the form of a cavity having an opening and a rear area furthest from the opening and wherein the portion of the second link is disposed closer to the rear area than to the opening.

5. A machine tool according to claim 4 wherein the portion of the second link is disposed at the rear third of the cavity.

6. A machine tool according to claim 1 wherein the first link and the portion of the second link are arranged to transmit either power or signals, or both power and signals.

7. A machine tool according to claim 1 wherein the at least one electrical contact is in the form of a "C" shaped conductive element mounted to a non-conductive block at the shank receiving area.

8. A machine tool comprising a stationary part and a spindle rotatable relative to the stationary part, the spindle having a shank receiving area for releasably accepting the shank of a cutter or other machine tool accessory, and comprising a first electrical link between the stationary part and the spindle, and a portion of a second electrical link at the shank receiving area in electrical connection with the first link for providing in use a disconnectable electrical link between the spindle and the shank, wherein the portion of the second link is in the form of at least one electrical contact, wherein the at least one electrical contact is in the form of a "C" shaped conductive element mounted to a non-conductive block at the shank receiving area.

9. A machine tool according to claim 8 wherein the block is releasably held at the area.

10. A machine tool according to claim 8 wherein the first link and the portion of the second link are arranged to transmit either power or signals, or both power and signals.

11. A machine tool according to claim 8 wherein, the portion of the second link at the shank receiving area includes any electrical link between the shank and the spindle.

12. A machine tool according to claim 11 wherein, the electrical link comprises a disconnectable physical contact between the spindle and the shank.

13. A machine tool according to claim 8 wherein the receiving area is in the form of a cavity having an opening and a rear area furthest from the opening and wherein the portion of the second link is disposed closer to the rear area than to the opening.

14. A machine tool according to claim 13 wherein the portion of the second link is disposed at the rear third of the cavity.

* * * * *